United States Patent
Jia et al.

(10) Patent No.: US 12,282,633 B2
(45) Date of Patent: Apr. 22, 2025

(54) METHOD AND SYSTEM FOR PREDICTING TOUCH INTERACTION POSITION ON LARGE DISPLAY BASED ON BINOCULAR CAMERA

(71) Applicant: Hangzhou Dianzi University, Hangzhou (CN)

(72) Inventors: Gangyong Jia, Hangzhou (CN); Yumiao Zhao, Hangzhou (CN); Huanle Rao, Hangzhou (CN); Ziwei Song, Hangzhou (CN); Minghui Yu, Hangzhou (CN); Hong Xu, Hangzhou (CN)

(73) Assignee: HANGZHOU DIANZI UNIVERSITY (CN)

( * ) Notice: Subject to any disclaimer, the term of this patent is extended or adjusted under 35 U.S.C. 154(b) by 0 days.

(21) Appl. No.: 18/242,040

(22) Filed: Sep. 5, 2023

(65) Prior Publication Data
US 2024/0077977 A1    Mar. 7, 2024

(30) Foreign Application Priority Data

Sep. 5, 2022    (CN) .......................... 202211095073.4

(51) Int. Cl.
| | | |
|---|---|---|
| G06F 3/042 | (2006.01) |
| G06V 10/77 | (2022.01) |
| G06V 10/774 | (2022.01) |
| G06V 10/80 | (2022.01) |
| G06V 10/82 | (2022.01) |
| G06V 20/40 | (2022.01) |
| G06V 40/20 | (2022.01) |

(52) U.S. Cl.
CPC ........ G06F 3/0425 (2013.01); G06V 10/7715 (2022.01); G06V 10/774 (2022.01); G06V 10/806 (2022.01); G06V 10/82 (2022.01); G06V 20/46 (2022.01); G06V 40/28 (2022.01)

(58) Field of Classification Search
USPC .......................................................... 345/175
See application file for complete search history.

(56) References Cited

U.S. PATENT DOCUMENTS 9,727,874 B2 *   8/2017   Navaratnam ....... H04M 3/5125
11,632,258 B1 *  4/2023   Libin ..................... G06F 3/165
                                                            709/204
(Continued)

*Primary Examiner* — Amy Onyekaba
(74) *Attorney, Agent, or Firm* — Onello & Mello, LLP

(57) ABSTRACT

Disclosed is a method and system for predicting a touch interaction position on a large display based on a binocular camera. The method includes: separately acquiring arm movement video frames of a user and facial and eye movement video frames of the user by a binocular camera; extracting a video clip of each tapping action from the arm movement video frames and the facial and eye movement video frames and obtaining a key frame by screening; marking the key frame of each tapping action with coordinates to indicate coordinates of a finger in a display screen; inputting the marked key frame to an efficient convolutional network for online video understanding (ECO)-Lite neural network for training to obtain a predictive network model; and inputting a video frame of a current operation to be predicted to the predictive network model and outputting a touch interaction position predicted for the current operation.

7 Claims, 4 Drawing Sheets

(56) References Cited

U.S. PATENT DOCUMENTS

| | | | |
|---|---|---|---|
| 11,693,483 B2* | 7/2023 | Singh | H04N 21/47205 |
| | | | 715/863 |
| 2014/0152540 A1* | 6/2014 | Franck | G06F 3/017 |
| | | | 345/156 |
| 2017/0118209 A1* | 4/2017 | Saravanan | G06F 18/22 |
| 2018/0091832 A1* | 3/2018 | Zeiler | H04N 21/8133 |
| 2020/0117898 A1* | 4/2020 | Tian | G06F 3/04815 |
| 2020/0276503 A1* | 9/2020 | Marchiorello | G06F 3/013 |
| 2022/0101654 A1* | 3/2022 | Zhang | G06N 3/08 |
| 2022/0314434 A1* | 10/2022 | Kranski | B25J 9/163 |

* cited by examiner

METHOD AND SYSTEM FOR PREDICTING TOUCH INTERACTION POSITION ON LARGE DISPLAY BASED ON BINOCULAR CAMERA

CROSS REFERENCE TO RELATED APPLICATION

This patent application claims the benefit and priority of Chinese Patent Application No. 202211095073.4, filed with the China National Intellectual Property Administration on Sep. 5, 2022, the disclosure of which is incorporated by reference herein in its entirety as part of the present application.

TECHNICAL FIELD

The present disclosure belongs to the technical field of human-machine interaction and particularly relates to a method and system for predicting a touch interaction position on a large display based on a binocular camera.

BACKGROUND

With the development of fifth-generation (5G) networks and artificial intelligence, interactive displays have been extensively used in life. During interaction, an interaction delay between a user operation and the performance of a display is an important factor influencing the user experience. There are two major causes for the interaction delay: one is hardware, mainly including a delay in capture and touch of a physical sensor and a delay of display output firmware; and the other one is software, mainly including a delay in interactive software processing a touch event and generating an output for a display to which the interactive software belongs. Since a hardware delay depends mainly on a product process of a manufacturer and hardware performance, it is hard to make an improvement on this. However, a system delay may be compensated by enhancing system software, and the cost may also be reduced. At present, a system can enhance the user experience by predicting a user behavior, which is also a current hot spot issue in the field of human-machine interaction. Many studies have proposed methods for reducing a delay from different perspectives. For example, in terms of hardware of an interactive display, the hardware performance is improved and a feedback effect is accelerated; and in terms of implementation by a user, a user interaction point is predicted in advance by tracking sight lines of the user. Powerful computing power of a graphic processing unit (GPU) and excellent predictive power of a neural network model allow a deep learning method to stand out from many methods, and using the deep learning method to predict a user behavior has become one of major methods for studying the issue.

SUMMARY

To meet the requirement of shortening an interactive delay for an interactive display at present, an objective of the present disclosure is to provide a method and system for predicting a touch interaction position on a large display based on a binocular camera that may allow a display to respond in advance to increase an interactive response speed of the display, shorten an interaction delay, and enhance the user experience, and that can predict a user touch position under the premise of achieving reasonable accuracy in an interactive display.

To achieve the above objective, the present disclosure adopts the following technical solution.

A method for predicting a touch interaction position on a large display based on a binocular camera includes the following steps:

S1, separately acquiring arm movement video frames of a user and facial and eye movement video frames of the user by a binocular camera;

S2, extracting a video clip of each tapping action from the arm movement video frames and the facial and eye movement video frames and obtaining a key frame by screening;

S3, marking the key frame of each tapping action with coordinates to indicate coordinates of a finger in a display screen;

S4, inputting the marked key frame to an efficient convolutional network for online video understanding (ECO)-Lite neural network for training to obtain a predictive network model; and S5, inputting a video frame of a current operation to be predicted to the predictive network model and outputting a touch interaction position predicted for the current operation.

In a preferred solution, in step S1, a camera is disposed right above a middle of a display and configured to acquire the facial and eye movement video frames of the user; and a network camera is disposed on a side of the display to acquire the arm movement video frames of the user.

In a preferred solution, in step S2, when extracting the key frame of each tapping action, 1000 ms before completion of each tapping event is split as a tapping action, and video clips of a plurality of tapping actions are obtainable by splitting; and for each video clip, an image frame with no movement is removed from 1000 ms video frames, and the key frame of each tapping action is obtained by extraction from remaining video frames at an interval of 50 ms.

In a preferred solution, a condition for determining the image frame with no movement is as follows:

redundant information of adjacent image frames is greater than 90%.

In a preferred solution, step S4 includes the following steps:

S41, taking a key frame extracted from the arm movement video frames and a key frame extracted from the facial and eye movement video frames as model inputs;

S42, performing convolutional processing using a convolution pool part, extracting two-dimensional (2D) image features by a 2D network, and arranging the extracted 2D image features in an order of video frames;

S43, taking the arranged 2D image features and an arrangement relationship as inputs to a three-dimensional (3D) convolution for end-to-end fusion to acquire movement features; and S44, merging a movement motion feature and facial and eye movement features after the 3D convolution, followed by inputting to a fully connected layer for result prediction and comparison with the marked coordinates, and calculating a loss value for parameter adjustment to obtain the predictive network model.

In a preferred solution, in step S42, the 2D network is BN-Inception.

In a preferred solution, in step S43, the 3D convolution is 3D-Resnet18.

The present disclosure further provides a system for predicting a touch interaction position on a large display based on a binocular camera, applied to the method for predicting a touch interaction position on a large display based on a binocular camera disclosed above and including:

- an acquisition module configured to separately acquire arm movement video frames of a user and facial and eye movement video frames of the user by a binocular camera;
- an extraction module configured to extract a video clip of each tapping action from the arm movement video frames and the facial and eye movement video frames and obtain a key frame by screening;
- a marking module configured to mark the key frame of each tapping action with coordinates to indicate coordinates of a finger in a display screen;
- a training module configured to input the marked key frame to an ECO-Lite neural network for training to obtain a predictive network model; and
- a prediction module configured to input a video frame of a current operation to be predicted to the predictive network model and output a touch interaction position predicted for the current operation.

In a preferred solution, the predictive network model includes a dual-input layer, a dual-2D convolutional network layer, a dual-2D feature map concatenating layer, a 3D convolutional network layer, a feature synthesis layer, and a fully connected layer that are distributed in sequence, where the dual-input layer, the dual-2D convolutional network layer, and the dual-2D feature map concatenating layer are connected in one-to-one correspondence.

Compared with the prior art, the present disclosure has the following beneficial effects.

The present disclosure realizes prediction on a touch position on a large display using camera images instead of a traditional costly eyeball tracker or machine learning method. In terms of a prediction result, the present disclosure is more accurate in predicted position, lower in calculation quantity, and higher in prediction speed than an existing prediction method.

DETAILED DESCRIPTION OF THE EMBODIMENTS

In order to describe the embodiments of the present disclosure more clearly, the specific embodiments of the present disclosure will be described below with reference to the accompanying drawings. Apparently, the drawings in the following description show merely some embodiments of the present disclosure, and other drawings and other embodiments may be derived from these drawings by those of ordinary skill in the art without creative efforts.

Figure 1:
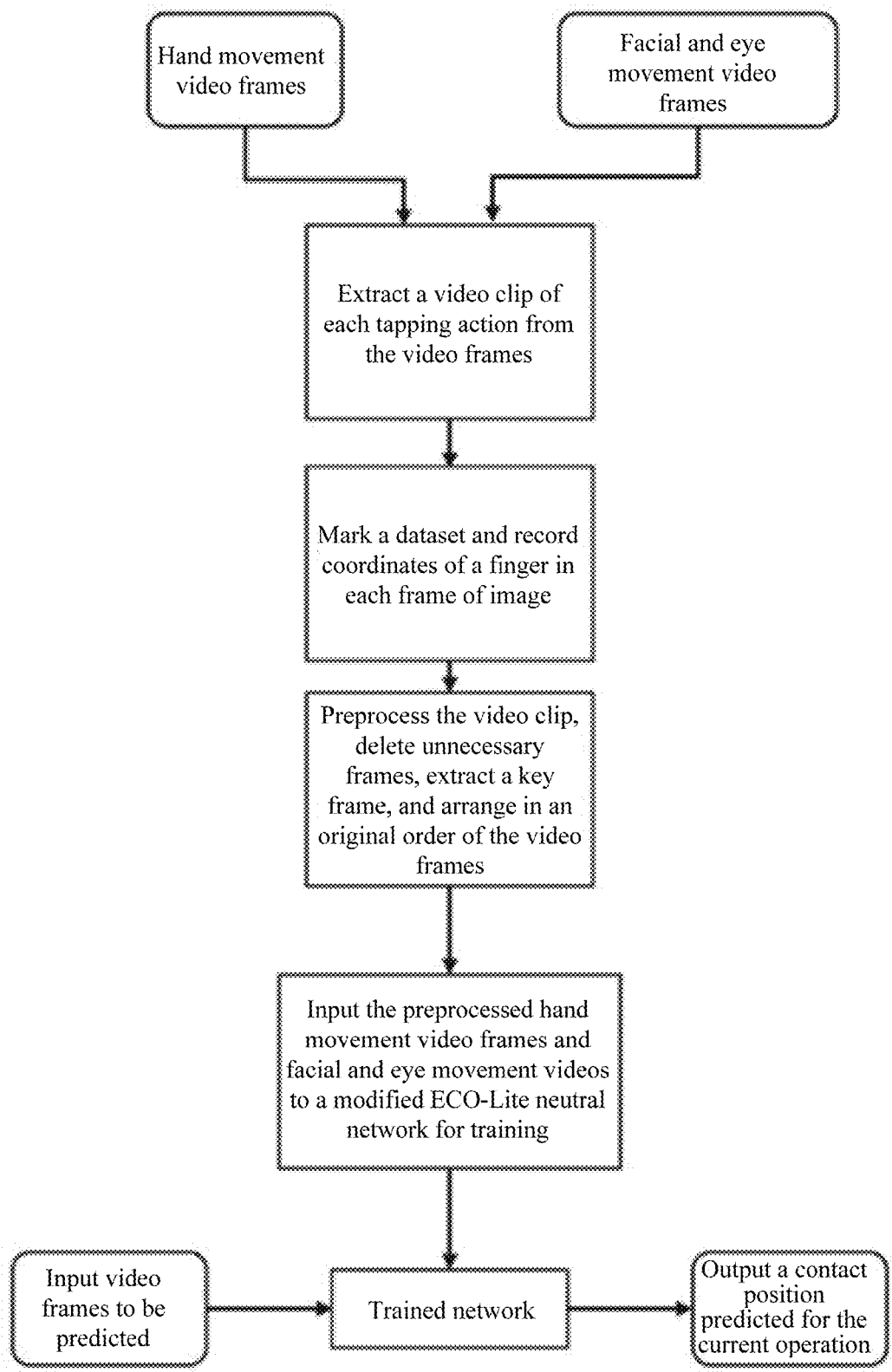
FIG. 1 is a flowchart of a method for predicting a touch interaction position on a large display based on a binocular camera according to an embodiment of the present disclosure.

As shown in FIG. 1, a method for predicting a touch interaction position on a large display based on a binocular camera according to an embodiment of the present disclosure includes the following steps.

S1, arm movement video frames of a user and facial and eye movement video frames of the user are acquired separately by a binocular camera.

Figure 2:
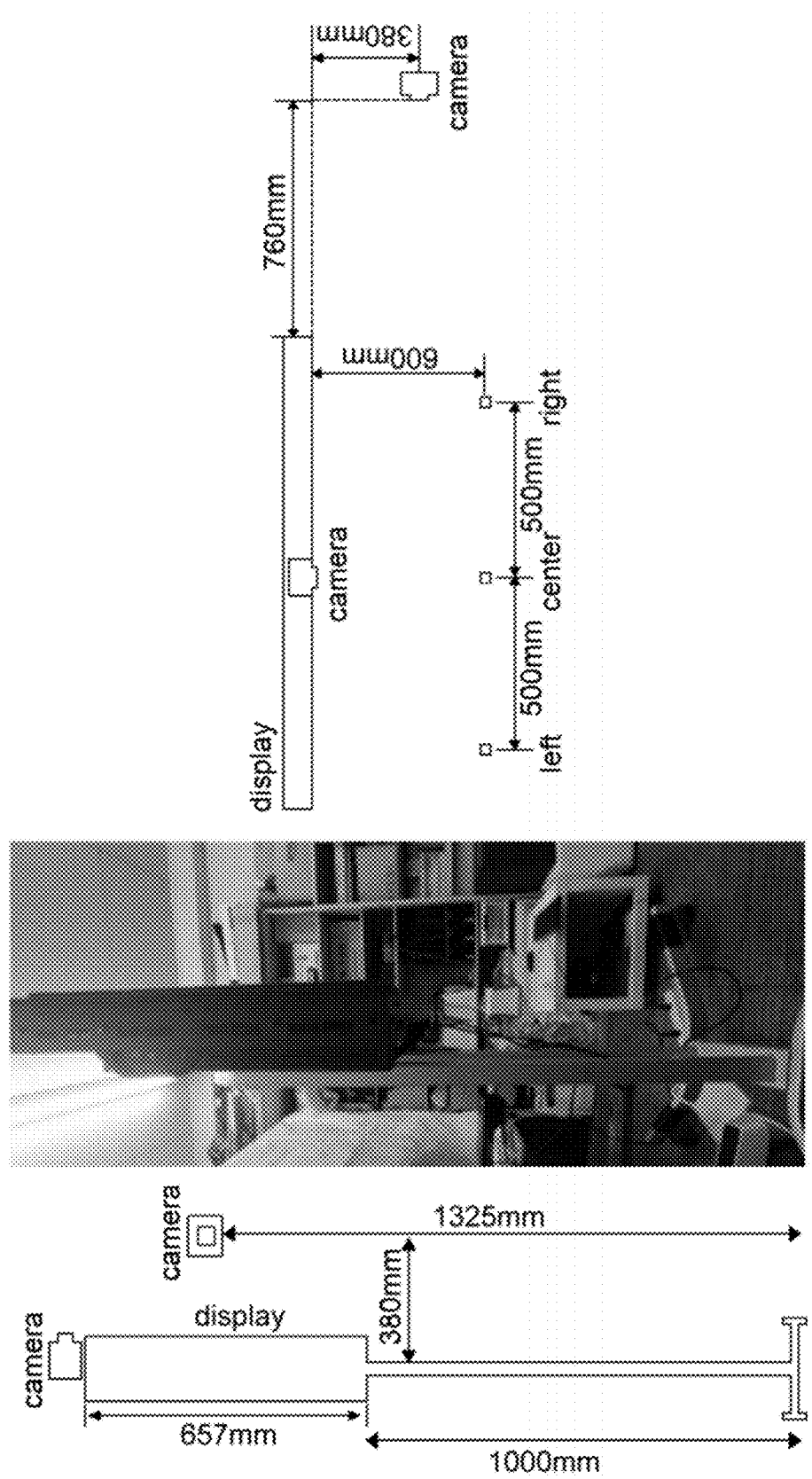
FIG. 2 is a deployment diagram of a binocular camera according to an embodiment of the present disclosure.

Specifically, as shown in FIG. 2, a camera is disposed right above a middle of a display and configured to acquire the facial and eye movement video frames of the user; and a network camera is disposed on a side of the display to acquire the arm movement video frames of the user.

S2, a video clip of each tapping action is extracted from the arm movement video frames and the facial and eye movement video frames and a key frame is obtained by screening.

Figure 3:
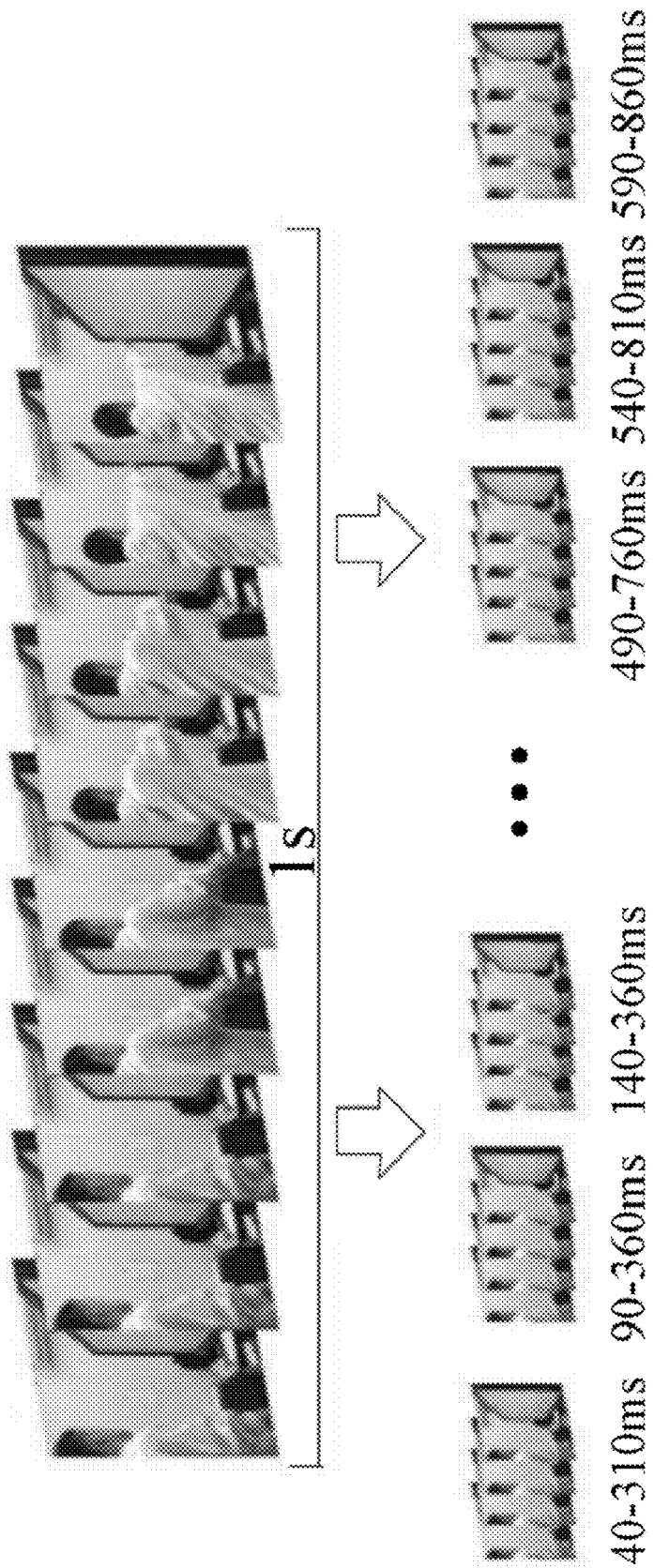
FIG. 3 is a diagram of a grouping process of video frames according to an embodiment of the present disclosure.

Specifically, as shown in FIG. 3, when extracting the key frame of each tapping action, 1000 ms before completion of each tapping event is split as a tapping action, and video clips of a plurality of tapping actions are obtainable by splitting.

For each video clip, an image frame with no movement is removed from 1000 ms video frames, and the key frame of each tapping action is obtained by extraction from remaining video frames at an interval of 50 ms.

Specifically, a condition for determining the image frame with no movement is as follows:

redundant information of adjacent image frames is greater than 90%.

S3, the key frame of each tapping action is marked with coordinates to indicate coordinates of a finger in a display screen.

S4, the marked key frame is input to an ECO-Lite neural network for training to obtain a predictive network model.

Specifically, a network training process includes the following steps:

- S41, take a key frame extracted from the arm movement video frames and a key frame extracted from the facial and eye movement video frames as model inputs;
- S42, perform convolutional processing using a convolution pool part, extract 2D image features by a 2D network, and arrange the extracted 2D image features in an order of video frames;
- S43, take the arranged 2D image features and an arrangement relationship as inputs to a 3D convolution for end-to-end fusion to acquire movement features, where 3D convolution is 3D-Resnet18; and
- S44, merging a movement motion feature and facial and eye movement features after the 3D convolution, followed by inputting to a fully connected layer for result prediction and comparison with the marked coordinates, and calculating a loss value for parameter adjustment to obtain the predictive network model.

S5, input a video frame of a current operation to be predicted to the predictive network model and output a touch interaction position predicted for the current operation.

Based on the method for predicting a touch interaction position on a large display based on a binocular camera in the embodiment of the present disclosure, an embodiment of the present disclosure further provides a system for predicting a touch interaction position on a large display based on a binocular camera, including an acquisition module, an extraction module, a marking module, a training module, and a prediction module.

The acquisition module is configured to separately acquire arm movement video frames of a user and facial and eye movement video frames of the user by a binocular camera.

The extraction module is configured to extract a video clip of each tapping action from the arm movement video frames and the facial and eye movement video frames and obtain a key frame by screening.

The marking module is configured to mark the key frame of each tapping action with coordinates to indicate coordinates of a finger in a display screen.

Figure 4:
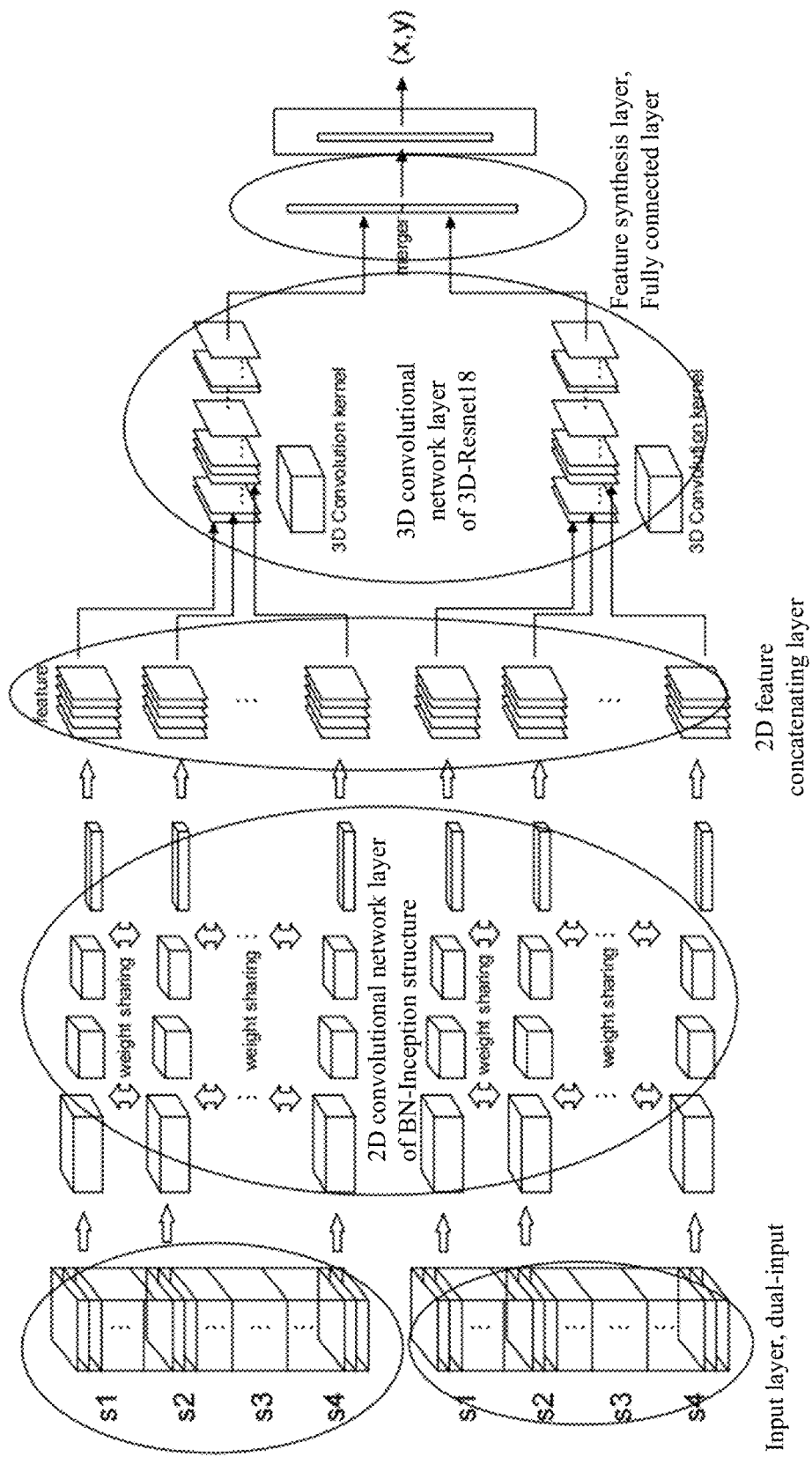
FIG. 4 is a network flowchart of a predictive network model according to an embodiment of the present disclosure.

The training module is configured to input the marked key frame to an ECO-Lite neural network for training to obtain a predictive network model. As shown in FIG. 4, the predictive network model includes a dual-input layer, a dual-2D convolutional network layer, a dual-2D feature map concatenating layer, a 3D convolutional network layer, a feature synthesis layer, and a fully connected layer that are distributed in sequence, where the dual-input layer, the dual-2D convolutional network layer, and the dual-2D feature map concatenating layer are connected in one-to-one correspondence.

The prediction module is configured to input a video frame of a current operation to be predicted to the predictive network model and output a touch interaction position predicted for the current operation.

For the specific operating process of each module, a reference may be made to the detailed descriptions in the method for predicting a touch interaction position on a large display based on a binocular camera described above, which will not be described redundantly here.

The method for predicting a touch interaction position on a large display based on a binocular camera in the embodiment of the present disclosure described above is mainly divided into four phases: data (data of two cameras) collection, data preprocessing, training using processed data of the two cameras, and prediction of a user touch position on an interactive display using a trained model. Specific steps are described as follows.

Step 1, two cameras are used, where one camera is configured to record a hand movement of a user, and the other camera is configured to record information of a facial movement and an eye movement of the user. The camera for recording the hand movement of the user is placed in a position parallel to the user, and the camera for recording the facial movement and the eye movement of the user is placed at an edge of a top side of the interactive display.

Step 2, since there are many video frames with low movement amplitude relative to previous frames among video frames per second, unnecessary video frames need to be deleted in order to reduce the time of model training. According to action characteristics of the user, the video frames per second are split into groups of images, and then an image of one frame is selected within each group as representative of the group. Finally, the representative frames of all the groups of images are arranged in the original order of the video frames to form new video frames. The video frames per second are processed in the same way to finally form preprocessed data.

Step 3, the processed hand movement video frames and facial and eye movement video frames are input to a modified ECO-Lite neutral network of one of convolutional neural network (CNN) architectures.

Internal operations in the neutral network are described as follows.

Operation 1, video frames are extracted from the processed hand movement images and facial and eye movement images, respectively. Several frames are extracted for each frame group as model inputs.

Operation 2, convolutional processing is performed using a convolution pool part; 2D image information is extracted from images by a 2D network; and extracted 2D features are arranged in an order of video frames.

Operation 3, the 2D features arranged in the order of the video frames are input to a 3D convolution kernel for convolution to acquire movement features.

Operation 4, the movement features after the 3D convolution are merged and then placed into a fully connected layer for result prediction. Comparison with a data marking result is performed, and a loss value is calculated for parameter adjustment. After the network training is completed, the trained network model is saved.

Operation 5, a contact position on an interactive display is predicted for input video frames of the hand movement and the facial and eye movements for testing using the trained network model in operation 4, and a network output is next contact position predicted for the current operation of the user.

Use Example 1

A method for predicting a touch position on a large display based on camera images in the Use Example specifically include the following steps.

Step 1, according to the device placement manner in FIG. 2, a camera is placed at an edge right above the middle of an interactive display to record a movement of a user's head and a change in sight lines during tapping; and a network camera is placed on the right of the display to record a movement of the user's arm and a tapping position during tapping.

Step 2, a tapping action is extracted from the movement video frames of the user's head and eyes acquired by the camera right above the middle and the video frames of the user's arm and the tapping position acquired by the network camera on the right. It is found by an experiment here that a tapping operation starts from an arm movement and ends at tapping and generally lasts for not more than 1000 ms at most and at least not less than 300 ms. Therefore, when extracting the key frame of each tapping action, 1000 ms before completion of each tapping event is split as a tapping action. Thus, frames of a video are split into video clips of a plurality of tapping actions.

Step 3, for each video clip, by the method in FIG. 3, image frames with no movement at the start and the end are removed from 1000 ms video frames, and the key frame of each tapping operation is obtained by extraction from remaining video frames at an interval of 50 ms.

Step 4, the extracted key frame of each tapping operation is marked with coordinates to indicate coordinates (x,y) of a finger in a screen.

Step 5, the marked training image is input to the designed training network. The design of the network is as shown in FIG. 4, and the key frame groups of the hand movement data and the facial and eye movement data are simultaneously input to the model for training. Finally, an output is obtained from the network; a loss function is calculated for the marking result; and internal parameters are adjusted and modified to obtain the final predictive model.

Internal operations in the neutral network are described as follows.

Operation 1, video frames are extracted from the processed hand movement images and facial and eye movement key frame images, respectively. Several frames are extracted for each frame group as model inputs.

Operation 2, convolutional processing is performed using a convolution pool part; and 2D image information is extracted from images by a 2D network (a batch normalization (BN) initial network part includes: inception3a, inception3b, and inception3c). Unnecessary influencing factors are reduced by a pooling layer; and extracted 2D features are arranged in an order of video frames.

Operation 3, the 2D features arranged in the order of the video frames and an arrangement sequence (including a context relationship of the image frames) as inputs to a 3D convolution kernel (3D-resnet includes conv3_x, conv4_x, and conv5_ x) for convolution to realize end-to-end fusion to acquire movement features.

Operation 4, a movement motion feature and facial and eye movement features after the 3D convolution are merged and then input to a fully connected layer for result prediction. Comparison with a data marking result is performed, and a loss value is calculated for parameter adjustment. After the network training is completed, the trained network model is saved.

Operation 5, a video group of a series of tapping operations of a user is preprocessed and then input to the trained model for predicting the coordinates (x*,y*) of next touch position.

The foregoing are merely detailed descriptions of the preferred embodiments and the principles of the present disclosure. Changes may be made to the specific embodiments by those of ordinary skill in the art according to the ideas provided in the present disclosure, and such changes should also be regarded as falling within the protection scope of the present disclosure.

What is claimed is:

1. A method for predicting a touch interaction position on a large display based on a binocular camera, comprising the following steps:
    S1, separately acquiring arm movement video frames of a user and facial and eye movement video frames of the user by a binocular camera;
    S2, extracting a video clip of each tapping action from the arm movement video frames and the facial and eye movement video frames and obtaining a key frame by screening;
    S3, marking the key frame of each tapping action with coordinates to indicate coordinates of a finger in a display screen;
    S4, inputting the marked key frame to an efficient convolutional network for online video understanding (ECO)-Lite neural network for training to obtain a predictive network model; and
    S5, inputting a video frame of a current operation to be predicted to the predictive network model and outputting a touch interaction position predicted for the current operation.

2. The method for predicting a touch interaction position on a large display based on a binocular camera according to claim 1, wherein in step S1, a camera is disposed right above a middle of a display and configured to acquire the facial and eye movement video frames of the user; and
    a network camera is disposed on a side of the display to acquire the arm movement video frames of the user.

3. The method for predicting a touch interaction position on a large display based on a binocular camera according to claim 1, wherein in step S2, when extracting the key frame of each tapping action, 1000 ms before completion of each tapping event is split as a tapping action, and video clips of a plurality of tapping actions are obtainable by splitting; and
    for each video clip, an image frame with no movement is removed from 1000 ms video frames, and the key frame of each tapping action is obtained by extraction from remaining video frames at an interval of 50 ms.

4. The method for predicting a touch interaction position on a large display based on a binocular camera according to claim 3, wherein a condition for determining the image frame with no movement is as follows:
    redundant information of adjacent image frames is greater than 90%.

5. The method for predicting a touch interaction position on a large display based on a binocular camera according to claim 3, wherein step S4 comprises the following steps:
    S41, taking a key frame extracted from the arm movement video frames and a key frame extracted from the facial and eye movement video frames as model inputs;
    S42, performing convolutional processing using a convolution pool part, extracting two-dimensional (2D) image features by a 2D network, and arranging the extracted 2D image features in an order of video frames;
    S43, taking the arranged 2D image features and an arrangement relationship as inputs to a three-dimensional (3D) convolution for end-to-end fusion to acquire movement features; and
    S44, merging a movement motion feature and facial and eye movement features after the 3D convolution, followed by inputting to a fully connected layer for result prediction and comparison with the marked coordinates, and calculating a loss value for parameter adjustment to obtain the predictive network model.

6. The method for predicting a touch interaction position on a large display based on a binocular camera according to claim 5, wherein in step S42, the 2D network is batch normalization (BN)-Inception.

7. The method for predicting a touch interaction position on a large display based on a binocular camera according to claim 5, wherein in step S43, the 3D convolution is 3D-Resnet18.

* * * * *